(12) United States Patent
Plemmons

(10) Patent No.: US 11,505,337 B1
(45) Date of Patent: Nov. 22, 2022

(54) GYROSCOPIC PROPULSION

(71) Applicant: Clay Plemmons, Candler, NC (US)

(72) Inventor: Clay Plemmons, Candler, NC (US)

( * ) Notice: Subject to any disclaimer, the term of this patent is extended or adjusted under 35 U.S.C. 154(b) by 507 days.

(21) Appl. No.: 16/579,986

(22) Filed: Sep. 24, 2019

(51) Int. Cl.
*B64G 1/40* (2006.01)
*F16H 33/10* (2006.01)
*F03G 3/08* (2006.01)

(52) U.S. Cl.
CPC ............ *B64G 1/409* (2013.01); *F03G 3/08* (2013.01); *F16H 33/10* (2013.01)

(58) Field of Classification Search
CPC .............................. B64G 1/409; F16H 33/10
See application file for complete search history.

(56) References Cited

U.S. PATENT DOCUMENTS

| | | | |
|---|---|---|---|
| 5,109,719 A * | 5/1992 | Piokins, Jr. | B64G 1/32 74/64 |
| 5,243,868 A | 9/1993 | Schonberger | |
| 5,256,942 A * | 10/1993 | Wood | B64G 1/28 74/5.34 |
| D447,523 S | 9/2001 | Christianson | |
| 6,729,197 B2 | 5/2004 | Adcock | |
| 6,745,980 B2 | 6/2004 | Neff | |
| 7,121,159 B2 | 10/2006 | Tippett | |
| 7,832,297 B2 * | 11/2010 | Hewatt | G01C 19/02 74/5.37 |
| 8,297,138 B2 | 10/2012 | Harrison | |
| 9,140,341 B2 | 9/2015 | Ozturk | |

* cited by examiner

*Primary Examiner* — Vicky A Johnson
(74) *Attorney, Agent, or Firm* — Kyle A. Fletcher, Esq.

(57) ABSTRACT

The gyroscopic impulse motor rigidly attaches to a superstructure. The gyroscopic impulse motor transfers a plurality of independent torqueing forces to the superstructure. By independent is meant the amount of force applied by any first independent torqueing force is independent of the amount of torqueing force applied by any second independent torqueing force generated by the gyroscopic impulse motor. By independent is further meant that the selected direction any first independent torqueing force is independent of the selected direction of any second independent torqueing force generated by the gyroscopic impulse motor. By controlling the amount and direction of the plurality of independent torqueing forces applied by the gyroscopic impulse motor to the superstructure, the superstructure can be rotated. By properly aligning the amount and direction of the plurality of independent torqueing forces applied by the gyroscopic impulse motor, a net propulsive force can further be generated.

16 Claims, 6 Drawing Sheets

GYROSCOPIC PROPULSION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including cosmonautic vehicles, more specifically, an unconventional propulsion system for a cosmonautic vehicle. (B64G1/409)

SUMMARY OF INVENTION

The gyroscopic propulsion device may also be referred to as a gyroscopic impulse motor. The gyroscopic impulse motor is configured for use with a superstructure. The gyroscopic impulse motor rigidly attaches to the superstructure. The gyroscopic impulse motor transfers a plurality of independent torqueing forces to the superstructure. By independent is meant the amount of force applied by any first independent torqueing force is independent of the amount of torqueing force applied by any second independent torqueing force generated by the gyroscopic impulse motor. By independent is further meant that the selected direction any first independent torqueing force is independent of the selected direction of any second independent torqueing force generated by the gyroscopic impulse motor. By controlling the amount and direction of the plurality of independent torqueing forces applied by the gyroscopic impulse motor to the superstructure, the superstructure can be rotated. By properly aligning the amount and direction of the plurality of independent torqueing forces applied by the gyroscopic impulse motor, a net propulsive force can further be generated.

The gyroscopic impulse motor comprises a plurality of GIP motor structures, a pedestal, and a superstructure. The pedestal attaches the plurality of GIP motor structures to the superstructure. Each of the plurality of GIP motor structures generates one of the independent torqueing forces that form the plurality of independent torqueing forces.

These together with additional objects, features and advantages of the gyroscopic impulse motor will be readily apparent to those of ordinary skill in the art upon reading the following detailed description of the presently preferred, but nonetheless illustrative, embodiments when taken in conjunction with the accompanying drawings.

In this respect, before explaining the current embodiments of the gyroscopic impulse motor in detail, it is to be understood that the gyroscopic impulse motor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the gyroscopic impulse motor.

It is therefore important that the claims be regarded as including such equivalent construction insofar as they do not depart from the spirit and scope of the gyroscopic impulse motor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1A:
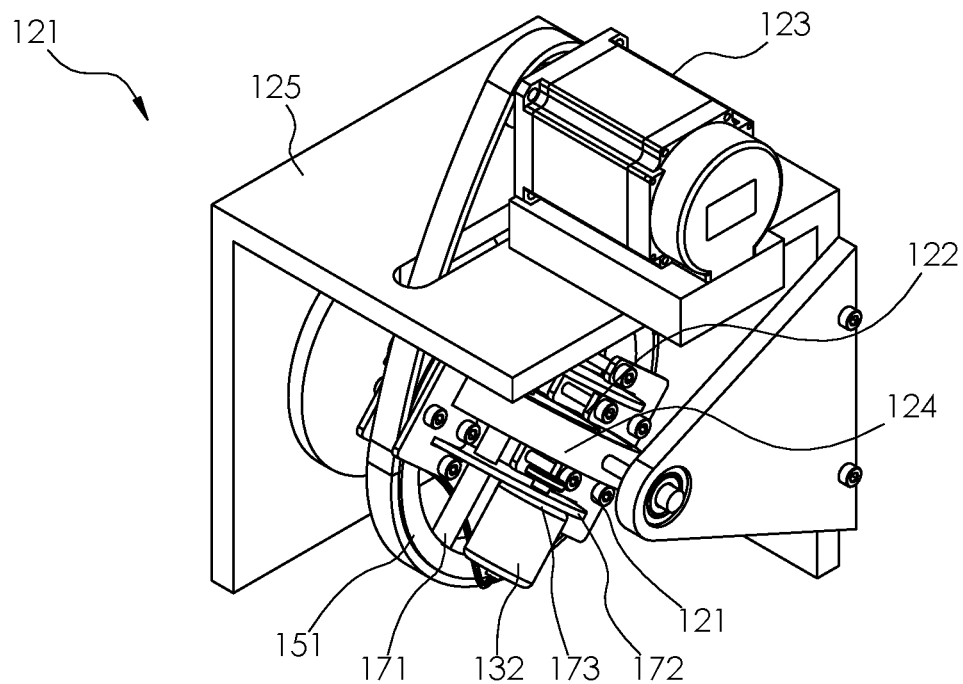
FIG. 1A is a perspective detail view of an embodiment of the disclosure.
Figure 2A:
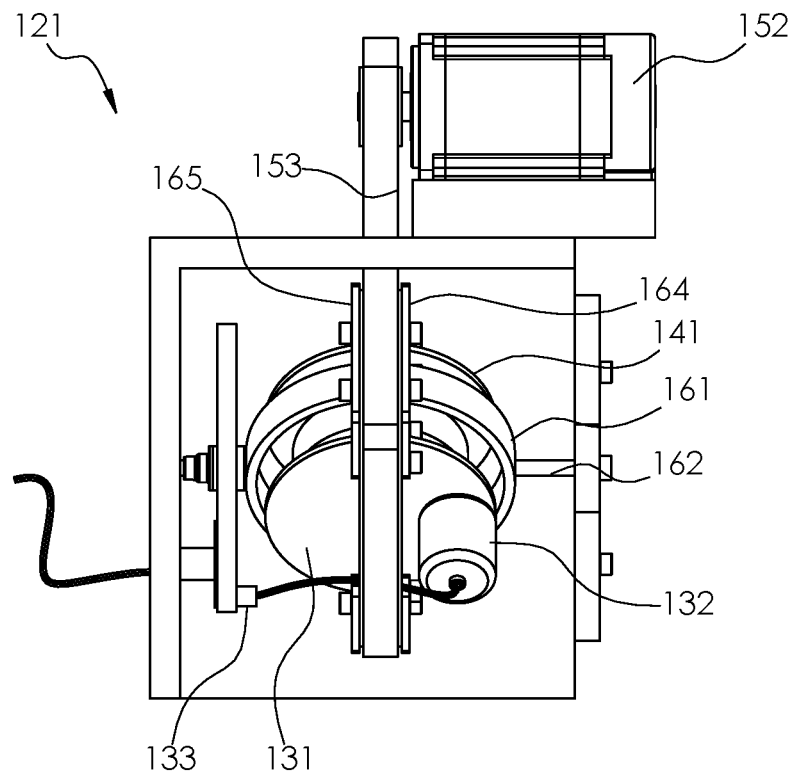
FIG. 2A is a top detail view of an embodiment of the disclosure.
Figure 1B:
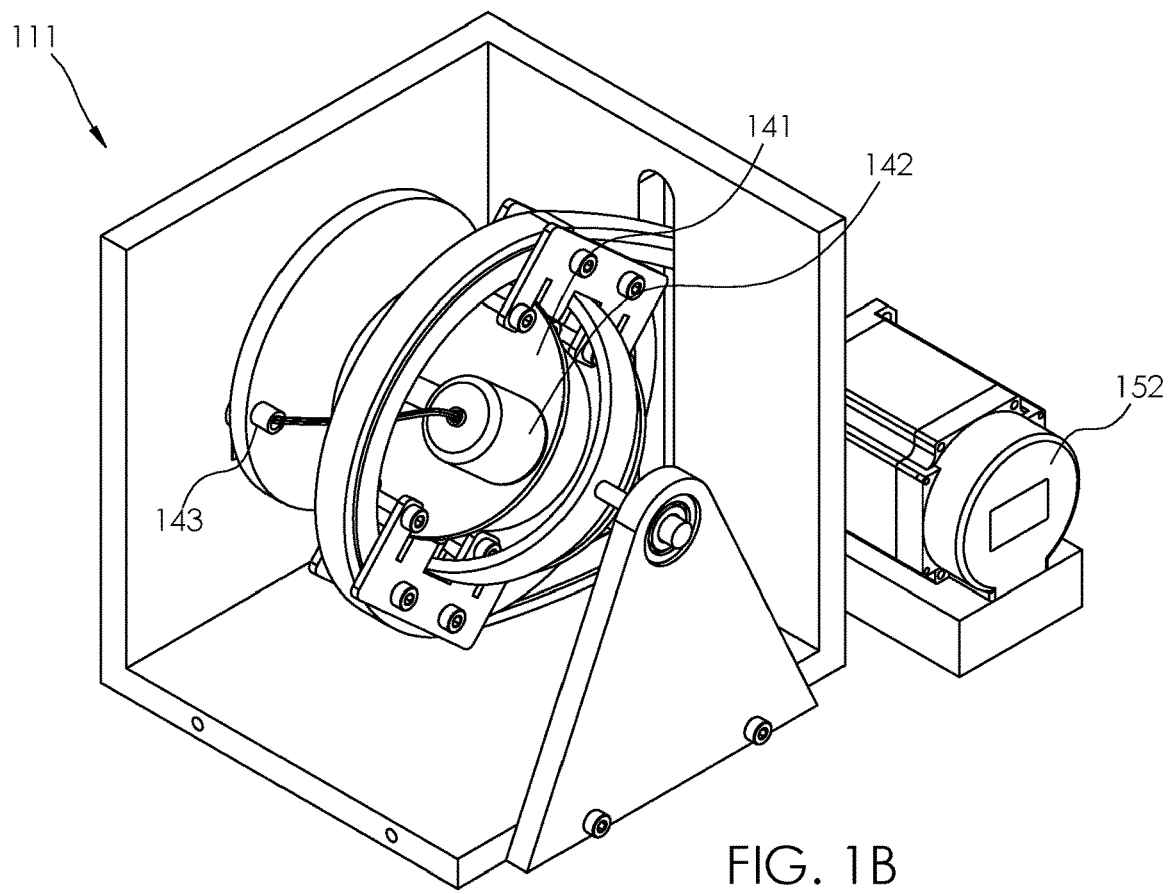
FIG. 1B is a perspective detail view of an embodiment of the disclosure.
Figure 2B:
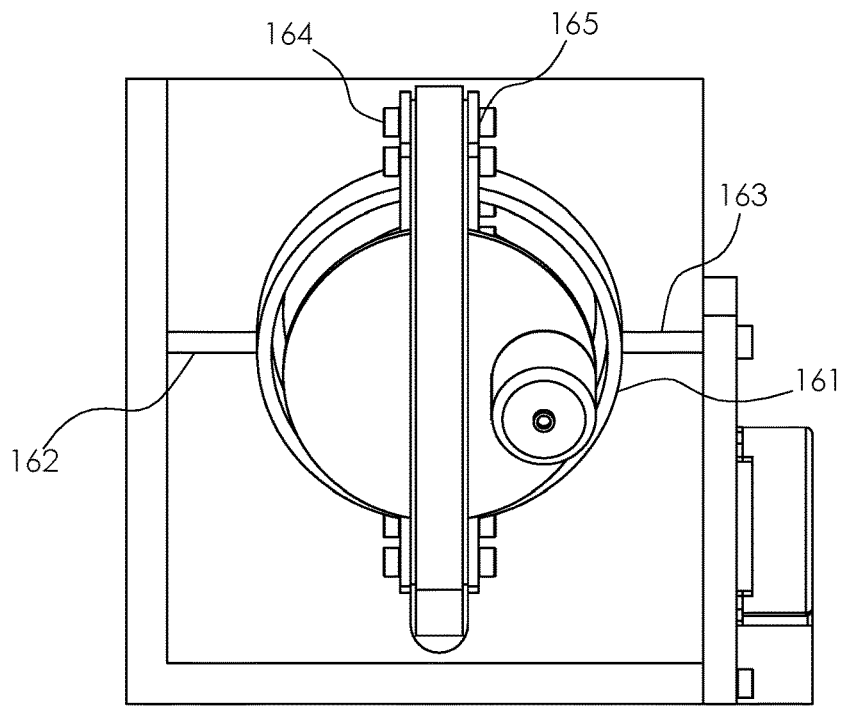
FIG. 2B is a top detail view of an embodiment of the disclosure.
Figure 3:
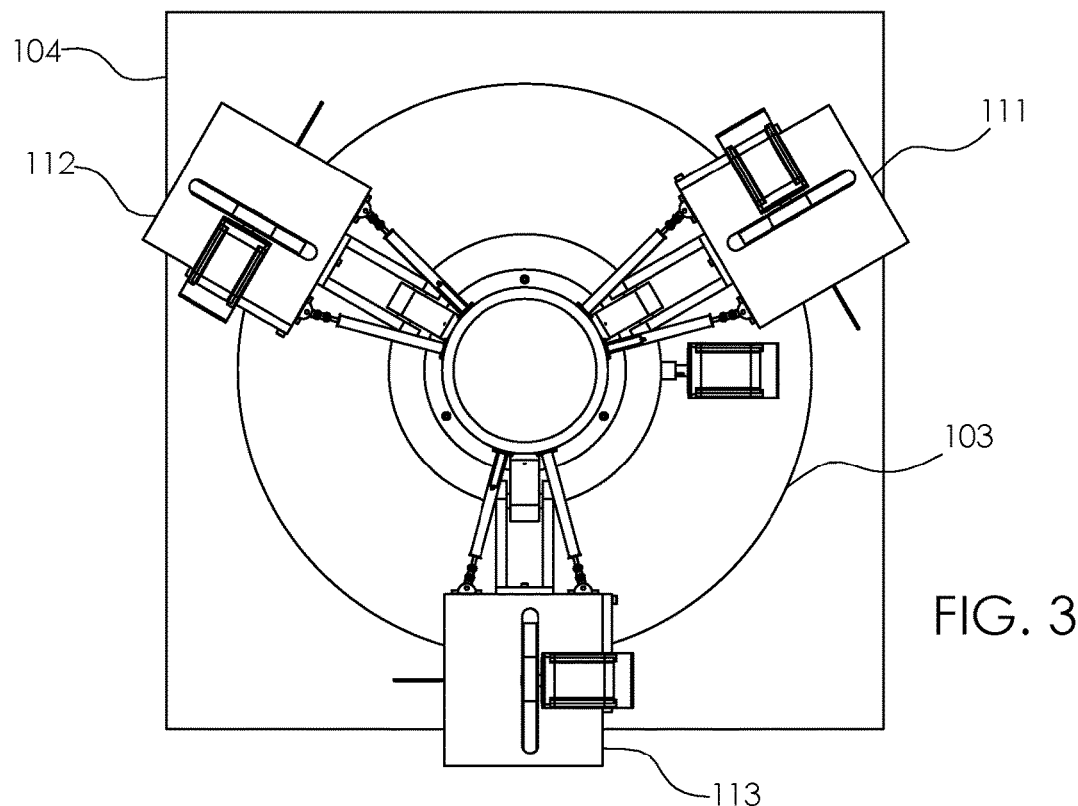
FIG. 3 is a top view of an embodiment of the disclosure.
Figure 4:
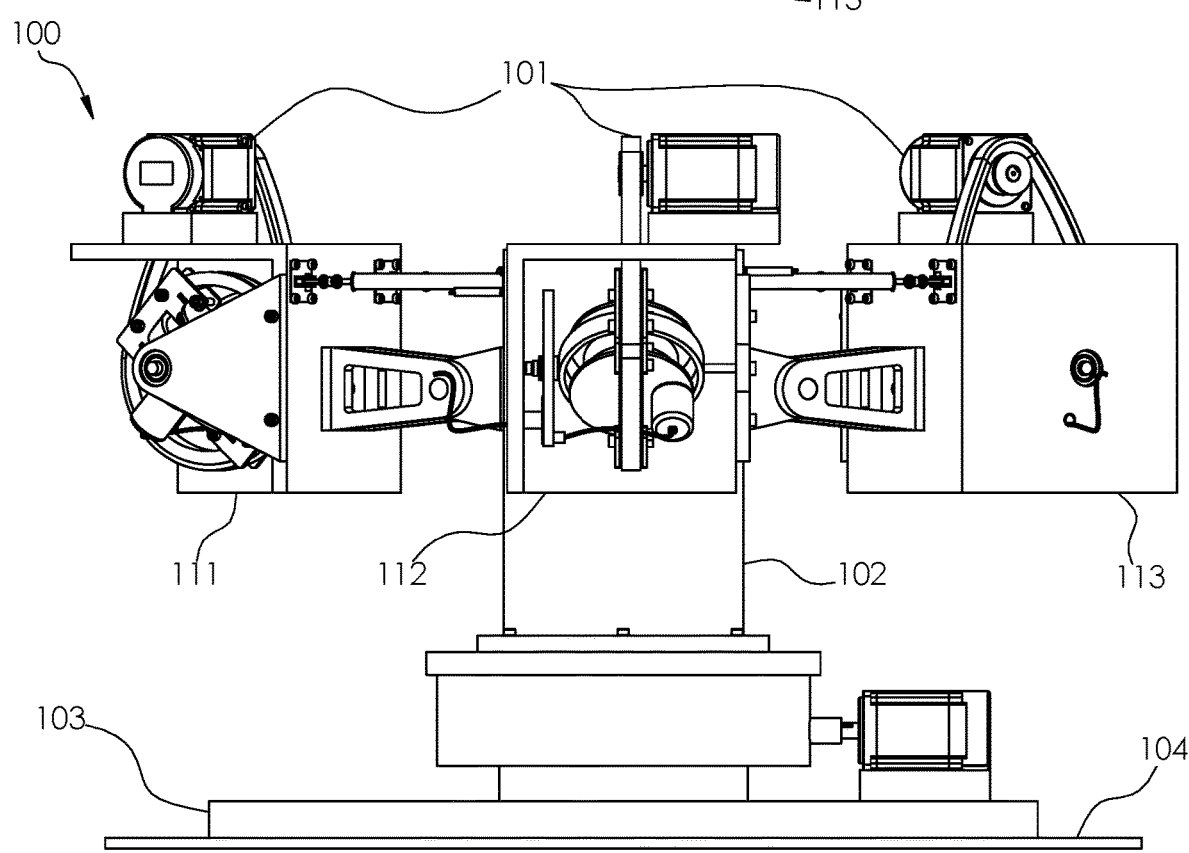
FIG. 4 is a side view of an embodiment of the disclosure.
Figure 5A:
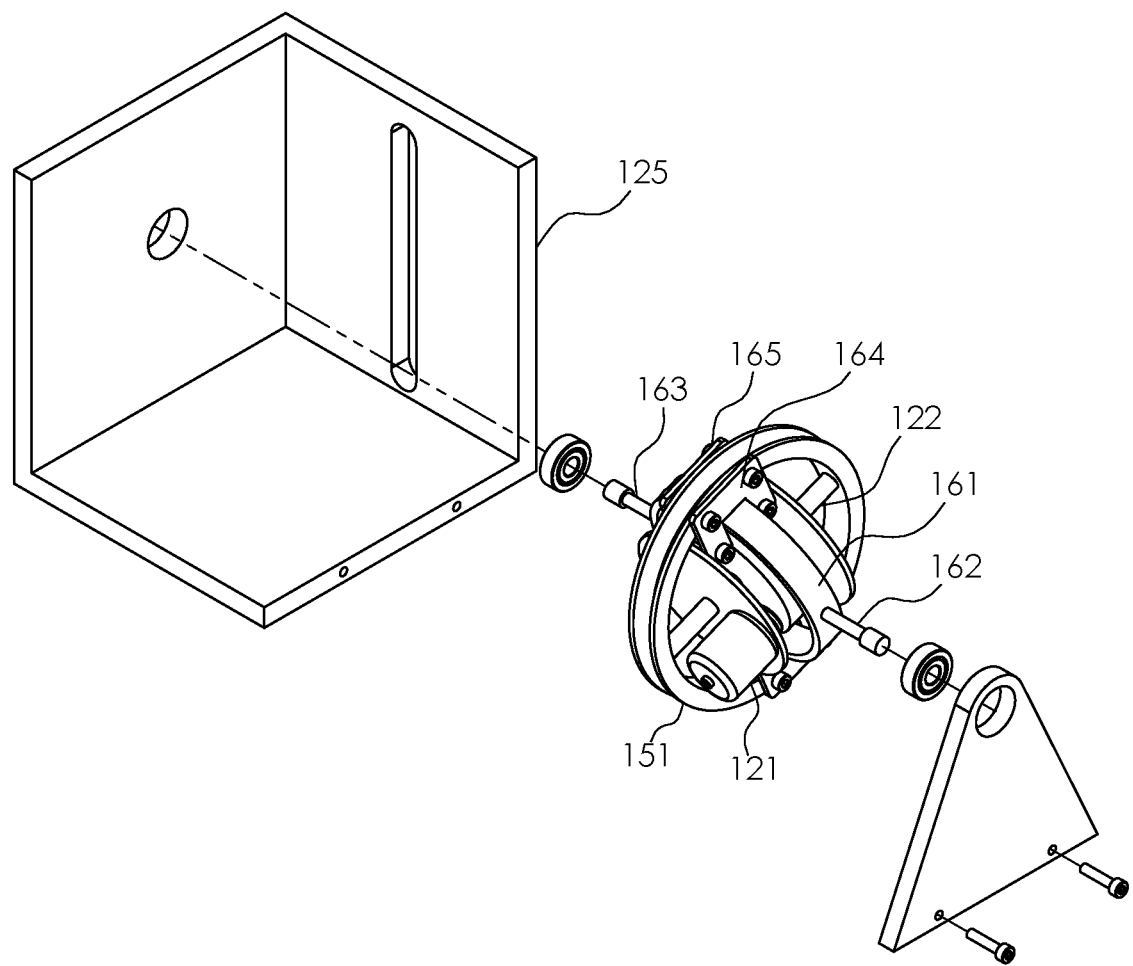
FIG. 5A is an exploded view of an embodiment of the disclosure.
Figure 5B:
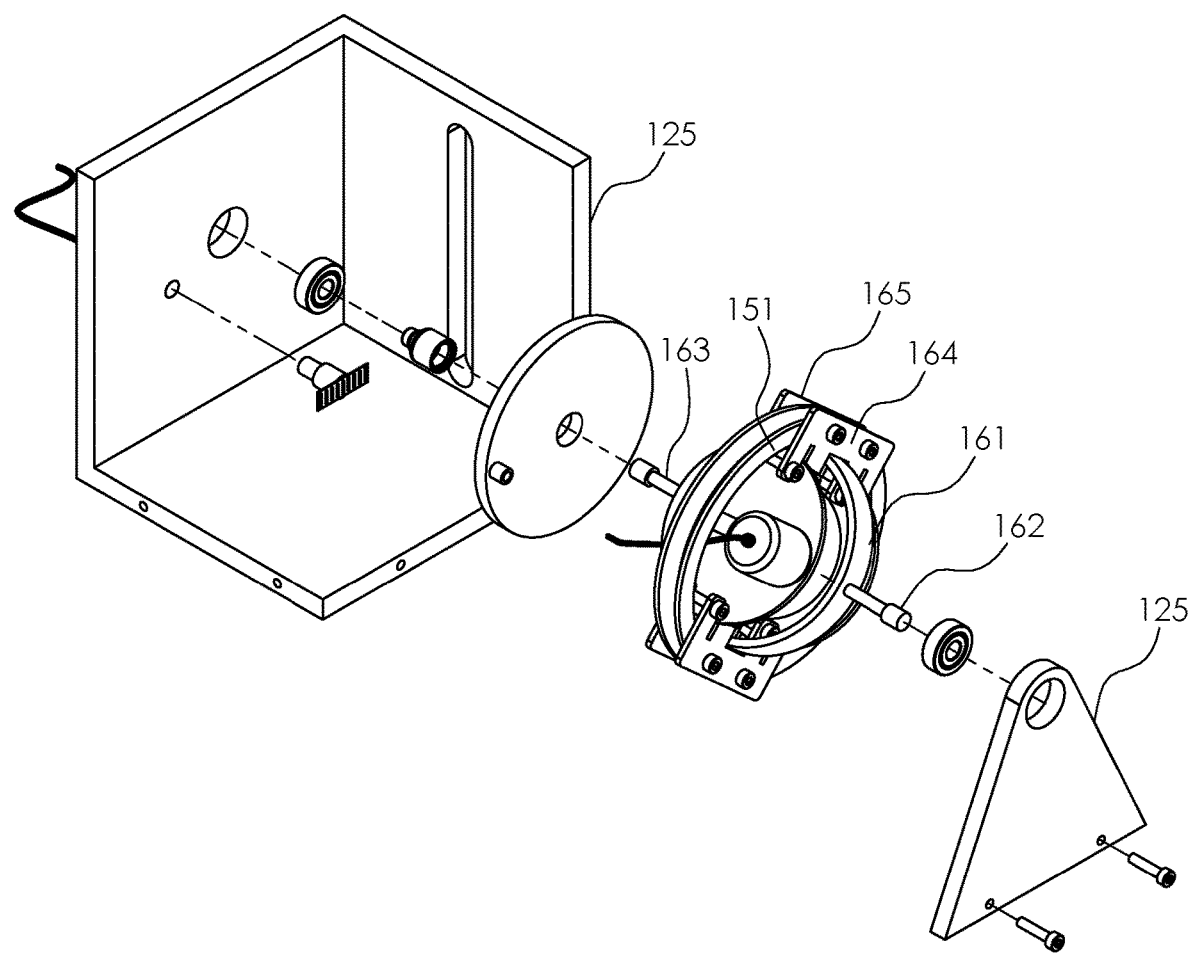
FIG. 5B is an exploded view of an embodiment of the disclosure.
Figure 6:
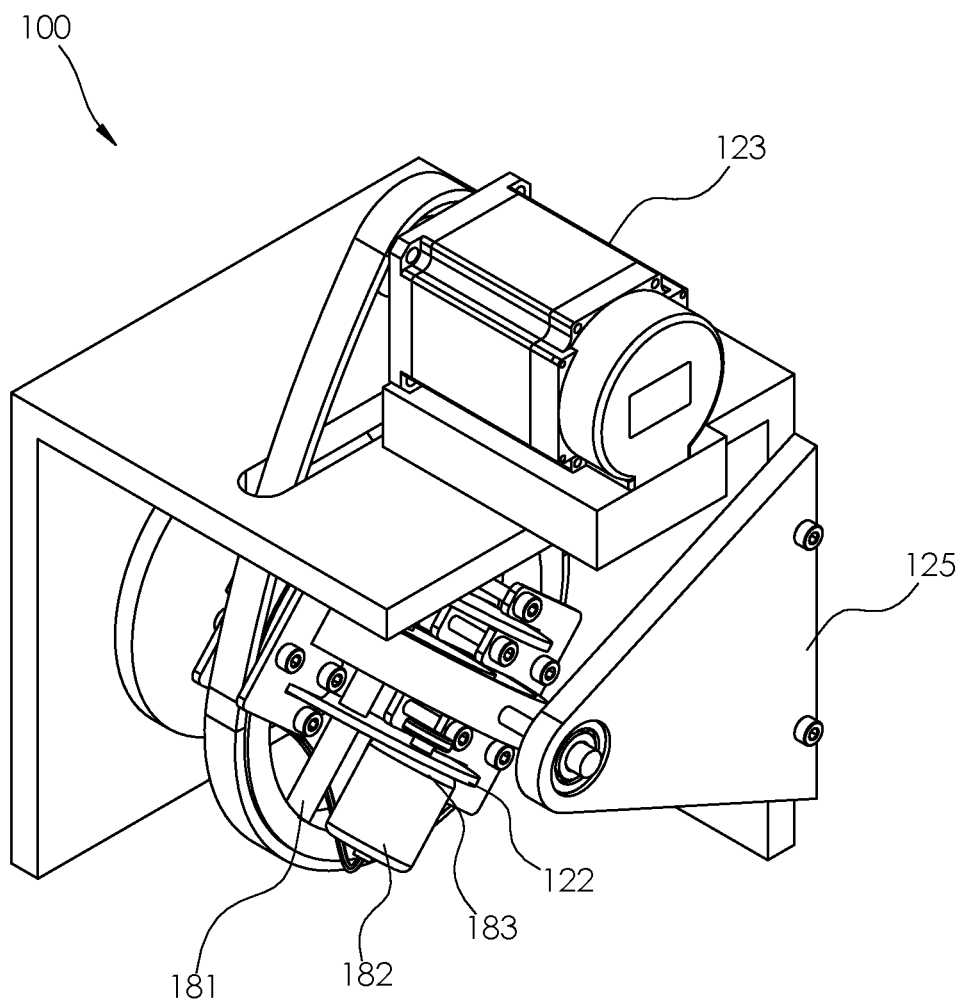
FIG. 6 is an enlarged view of an embodiment of the disclosure.

Detailed reference will now be made to one or more potential embodiments of the disclosure, which are illustrated in FIGS. 1 through 6.

The gyroscopic impulse motor 100 (hereinafter invention) is a propulsion system. The invention 100 is configured for use with a superstructure 104. The invention 100 rigidly attaches to the superstructure 104. The invention 100 transfers a plurality of independent torqueing forces to the superstructure 104. By independent is meant the amount of force applied by any first independent torqueing force is independent of the amount of torqueing force applied by any second independent torqueing force generated by the invention 100. By independent is further meant that the selected direction any first independent torqueing force is independent of the selected direction of any second independent torqueing force generated by the invention 100. By controlling the amount and direction of the plurality of independent torqueing forces applied by the invention 100 to the superstructure 104, the superstructure 104 can be rotated. By properly aligning the amount and direction of the plurality of independent torqueing forces applied by the invention 100, a net propulsive force can further be generated.

The invention 100 comprises a plurality of GIP motor structures 101, a pedestal 103, and a superstructure 104. The pedestal 103 attaches the plurality of GIP motor structures 101 to the superstructure 104. Each of the plurality of GIP motor structures 101 generates one of the independent torqueing forces that form the plurality of independent torqueing forces.

The superstructure 104 is a mechanical structure that is capable of motion selected from the group consisting of: a) linear motion in at least two dimensions; b) rotational motion in at least one dimension; and, c) linear motion in at least one dimension and rotational motion in at least one dimension. While the superstructure 104 can be any mechanical structure that meets the requirements of the previous sentence, the applicant respectfully suggests that this disclosure is most readily understood when the superstructure 104 is thought of as a spacecraft.

Each of the plurality of GIP motor structures 101 mounts on the pedestal 103. The pedestal 103 is a mechanical structure that transfers the load of the torqueing forces generated by each of the pedestal 103 directly to the superstructure 104. The pedestal 103 is defined elsewhere in this disclosure.

In the first potential embodiment of the disclosure, the plurality of GIP motor structures 101 are mounted on the pedestal 103 such that any first individual GIP motor structure 102 selected from the plurality of GIP motor structures 101 is perpendicular to both any second individual GIP motor structure 102 and to any individual third GIP motor 102 structure selected from the plurality of GIP motor structures 101. The superstructure 104 forms the structure on which the plurality of GIP motor structures 101 and the pedestal 103 mount.

Each of the plurality of GIP motor structures 101 is a gyroscopic structure. Each of the plurality of GIP motor structures 101 uses the properties of the angular momentum of a gyroscope to generate a torqueing force that returns the axis of rotation of the gyroscope to an original position after the axis of rotation has been deflected by a force. Each of the plurality of GIP motor structures 101 is configured to transfer this torqueing force to the pedestal 103 and the superstructure 104. The plurality of GIP motor structures 101 comprises a collection of individual GIP motor structures 102.

The plurality of GIP motor structures 101 comprises an x-axis GIP motor structure 111, a y-axis GIP motor structure 112, and a z-axis GIP motor structure 113.

The x-axis GIP motor structure 111 is a first individual GIP motor structure 102 selected from the plurality of GIP motor structures 101. The x-axis GIP motor structure 111 attaches to the pedestal 103 such that the x-axis GIP motor structure 111 is oriented along an arbitrarily selected x-axis.

The y-axis GIP motor structure 112 is a second individual GIP motor structure 102 selected from the plurality of GIP motor structures 101. The y-axis GIP motor structure 112 attaches to the pedestal 103 such that the y-axis GIP motor structure 112 is oriented along a selected y-axis that is perpendicular to the x-axis of the x-axis GIP motor structure 111.

The z-axis GIP motor structure 113 is a third individual GIP motor structure 102 selected from the plurality of GIP motor structures 101. The z-axis GIP motor structure 113 attaches to the pedestal 103 such that the z-axis GIP motor structure 113 is oriented along a selected z-axis that is both: a) perpendicular to the y-axis of the y-axis GIP motor structure 112; and, b) perpendicular to the x-axis of the x-axis GIP motor structure 111.

Each individual GIP motor structure 102 is a GIP motor structure selected from the plurality of GIP motor structures 101. The individual GIP motor structure 102 uses the properties of the angular momentum of a gyroscope to generate a torqueing force that returns the axis of rotation of the gyroscope to an original position after the axis of rotation has been deflected by a force. The individual GIP motor structure 102 transfers the load of the torqueing forces to the pedestal 103 and, through the pedestal 103, the superstructure 104. The individual GIP motor structure 102 controls the amount of torqueing force transferred to the pedestal 103. The individual GIP motor structure 102 controls the direction of the torqueing force transferred to the pedestal 103.

Each individual GIP motor structure 102 selected from the plurality of GIP motor structures 101 controls the amount of torqueing force generated by the individual GIP motor structure 102. Each individual GIP motor structure 102 selected from the plurality of GIP motor structures 101 controls the direction of the torqueing force generated by the individual GIP motor structure 102.

Each of the plurality of GIP motor structures 101 is independently controlled. By independently controlled is meant that the amount and direction generated by any first individual GIP motor structure 102 selected from the plurality of GIP motor structures 101 is selected independently of the amount and direction of the torqueing force generated by any second individual GIP motor structure 102 selected from the plurality of GIP motor structures 101. By independently controlling the torqueing force generated by each of the plurality of GIP motor structures 101, the vector sum of each of the independently controlled torqueing forces can be controlled to control the rotation of the superstructure 104.

By properly selecting and aligning the torqueing force generated by each of the plurality of GIP motor structures 101, the vector sum of each of the independently controlled torqueing forces can be controlled generate a propulsive force on the superstructure 104.

Each individual GIP motor structure 102 comprises a first gyroscopic system 121, a second gyroscopic system 122, a drive mechanism 123, a mounting apparatus 124, and a motor structure housing 125.

The motor structure housing 125 is a rigid structure that contains the first gyroscopic system 121, the second gyroscopic system 122, the drive mechanism 123, and the mounting apparatus 124. The motor structure housing 125 transfers the torqueing forces generated by the first gyroscopic system 121, the second gyroscopic system 122, the drive mechanism 123, and the mounting apparatus 124 to the pedestal 103.

The first gyroscopic system 121 is a gyroscope-based structure. The gyroscope is defined elsewhere in this disclosure. The first gyroscopic system 121 attaches to the drive mechanism 123. The first gyroscopic system 121 is mechanically linked to the mounting apparatus 124.

The drive mechanism 123 is a rotating structure. The first gyroscopic system 121 attaches to the drive mechanism 123 such that the rotation of the drive mechanism 123 rotates the first gyroscopic system 121. The rotation of the drive mechanism 123 applies a displacement force to the first gyroscopic system 121 that causes the first gyroscopic system 121 to generate a reactive force against the displacing force applied by the drive mechanism 123. The structure of the first gyroscopic system 121 transfers the reactive force generated by the first gyroscopic system 121 to the mounting apparatus 124. The reactive force generated by the first gyroscopic system 121 generates a portion of the torqueing force generated by the individual GIP motor structure 102 through the mounting apparatus 124 and the motor structure housing 125.

The first gyroscopic system 121 comprises a first spinning disk 131, a first gyroscopic drive motor 132, and a first slip ring connection 133.

The first spinning disk 131 is a disk structure. The first spinning disk 131 has a cylindrical disk shape. The rotating structure of the first spinning disk 131 forms the gyroscopic element of the first gyroscopic system 121. The first spinning disk 131 comprises a first SD shaft 171 and a first belt disk 172.

The first SD shaft 171 is a mechanical structure that attaches the first spinning disk 131 of the first gyroscopic system 121 to the interior surface of the ring structure of the drive mechanism 123 wheel 151 of the drive mechanism 123. The first SD shaft 171 attaches the first spinning disk 131 to the drive mechanism 123 wheel 151 such that the first spinning disk 131 can rotate freely.

The first belt disk 172 is a disk structure that attaches to the face of the disk structure of the first spinning disk 131 that is distal from the second spinning disk 141 of the second gyroscopic system 122. The center axis of the disk structure of the first belt disk 172 aligns with the center axis of the disk structure of the first spinning disk 131. The first belt disk 172 forms an attachment point for use by the first drive belt 173.

The first drive belt 173 is a belt that attaches the first gyroscopic drive motor 132 to the first belt disk 172 to create a belt drive used to rotate the first spinning disk 131 to create the gyroscopic structure of the first gyroscopic system 121.

The first gyroscopic drive motor 132 is an electric motor. The first gyroscopic drive motor 132 attaches to the inner surface of the ring structure of the drive mechanism 123 wheel 151 of the drive mechanism 123. The first gyroscopic drive motor 132 attaches to the first spinning disk 131 such that the rotation of the first gyroscopic drive motor 132 rotates the first spinning disk 131. The first gyroscopic drive motor 132 further comprises a first drive belt 173.

The first slip ring connection 133 electrically connects the first gyroscopic drive motor 132 to an externally provisioned source of electricity. The first slip ring connection 133 allows the first gyroscopic drive motor 132 to draw electricity while the drive mechanism 123 wheel 151 of the drive mechanism 123 is rotating. The slip ring is defined elsewhere in this disclosure.

The second gyroscopic system 122 is a gyroscope-based structure. The gyroscope is defined elsewhere in this disclosure. The second gyroscopic system 122 attaches to the drive mechanism 123. The second gyroscopic system 122 is mechanically linked to the mounting apparatus 124.

The drive mechanism 123 is a rotating structure. The second gyroscopic system 122 attaches to the drive mechanism 123 such that the rotation of the drive mechanism 123 rotates the second gyroscopic system 122. The rotation of the drive mechanism 123 applies a displacement force to the second gyroscopic system 122 that causes the second gyroscopic system 122 to generate a reactive force against the displacing force applied by the drive mechanism 123. The structure of the second gyroscopic system 122 transfers the reactive force generated by the second gyroscopic system 122 to the mounting apparatus 124. The reactive force generated by the second gyroscopic system 122 generates a portion of the torqueing force generated by the individual GIP motor structure 102 through the mounting apparatus 124 and the motor structure housing 125.

The position of the second gyroscopic system 122 on the drive mechanism 123 is diametrically opposed to the position of the first gyroscopic system 121. The direction of rotation of the gyroscopic structure of the second gyroscopic system 122 is opposite to the direction of rotation of the gyroscopic structure of the first gyroscopic system 121.

The second gyroscopic system 122 comprises a second spinning disk 141, a second gyroscopic drive motor 142, and a second slip ring connection 143.

The second spinning disk 141 is a disk structure. The second spinning disk 141 has a cylindrical disk shape. The rotating structure of the second spinning disk 141 forms the gyroscopic element of the second gyroscopic system 122. The second spinning disk 141 comprises a second SD shaft 181 and a second belt disk 182.

The second gyroscopic drive motor 142 is an electric motor. The second gyroscopic drive motor 142 attaches to the inner surface of the ring structure of the drive mechanism 123 wheel 151 of the drive mechanism 123. The second gyroscopic drive motor 142 attaches to the second spinning disk 141 such that the rotation of the second gyroscopic drive motor 142 rotates the second spinning disk 141. The second gyroscopic drive motor 142 further comprises a second drive belt 183.

The second SD shaft 181 is a mechanical structure that attaches the second spinning disk 141 of the second gyroscopic system 122 to the interior surface of the ring structure of the drive mechanism 123 wheel 151 of the drive mechanism 123. The second SD shaft 181 attaches the second spinning disk 141 to the drive mechanism 123 wheel 151 such that the second spinning disk 141 can rotate freely.

The second belt disk 182 is a disk structure that attaches to a point on the face of the disk structure of the second spinning disk 141 that is distal from the first spinning disk 131 of the first gyroscopic system 121. The center axis of the disk structure of the second belt disk 182 aligns with the center axis of the disk structure of the second spinning disk 141. The second belt disk 182 forms an attachment point for use by the second drive belt 183.

The second drive belt 183 is a belt that attaches the second gyroscopic drive motor 142 to the second belt disk 182 to create a belt drive used to rotate the second spinning disk 141 to create the gyroscopic structure of the second gyroscopic system 122.

The second slip ring connection 143 electrically connects the second gyroscopic drive motor 142 to an externally provisioned source of electricity. The second slip ring connection 143 allows the second gyroscopic drive motor 142 to draw electricity while the drive mechanism 123 wheel 151 of the drive mechanism 123 is rotating. The slip ring is defined elsewhere in this disclosure.

The drive mechanism 123 is a mechanical structure. The drive mechanism 123 is a rotating structure. The rotation of the drive mechanism 123 is mechanically driven. The first gyroscopic system 121 and the second gyroscopic system 122 attach to the drive mechanism 123. The position of the second gyroscopic system 122 on the drive mechanism 123 is diametrically opposed to the position of the first gyroscopic system 121 on the drive mechanism 123. The rotation of the drive mechanism 123 rotates the first gyroscopic system 121 such that the rotation of the drive mechanism 123 applies a displacement force to the first gyroscopic system 121. The drive mechanism 123 rotates the second gyroscopic system 122 such that the rotation of the drive mechanism 123 applies a displacement force to the second gyroscopic system 122.

The opposite rotation of the second gyroscopic system 122 relative to the first gyroscopic system 121 inhibits both the first gyroscopic system 121 and the second gyroscopic system 122 from impacting the rotation of the drive mechanism 123 thereby directing the net reactive forces into the mounting apparatus 124 for transfer into the pedestal 103 through the motor structure housing 125 as a portion of the torqueing force.

The drive mechanism 123 comprises a drive mechanism 123 wheel 151, a drive mechanism 123 motor 152, and a drive mechanism 123 belt 153.

The drive mechanism 123 wheel 151 is a ring structure. The drive mechanism 123 wheel 151 is a circular structure. The drive mechanism 123 wheel 151 is a rotating structure. The drive mechanism 123 wheel 151 mechanically connects to the mounting apparatus 124. The first gyroscopic system 121 attaches to the inner surface of the ring structure of the drive mechanism 123 wheel 151. The first gyroscopic drive motor 132 attaches to the inner surface of the ring structure of the drive mechanism 123 wheel 151. The second gyroscopic system 122 attaches to the inner surface of the ring structure of the drive mechanism 123 wheel 151. The second gyroscopic drive motor 142 attaches to the inner surface of the ring structure of the drive mechanism 123 wheel 151.

The rotation of the drive mechanism 123 wheel 151 changes the angular momentum of the first spinning disk 131 of the first gyroscopic system 121 such that a displacement force is applied to the first spinning disk 131 of the first gyroscopic system 121. The rotation of the drive mechanism 123 wheel 151 changes the angular momentum of the second spinning disk 141 of the second gyroscopic system 122 such that a displacement force is applied to the second spinning disk 141 of the second gyroscopic system 122.

The drive mechanism 123 motor 152 is an electric motor. The drive mechanism 123 motor 152 attaches to the motor structure housing 125 of the individual GIP motor structure 102. The rotation of the drive mechanism 123 motor 152 forms a belt drive system that drives the rotation of the drive mechanism 123 wheel 151.

The drive mechanism 123 belt 153 is a band structure. The drive mechanism 123 belt 153 attaches the drive mechanism 123 motor 152 to the drive mechanism 123 wheel 151 such that the rotation of the drive mechanism 123 motor 152 rotates the drive mechanism 123 wheel 151. The use of the drive mechanism 123 wheel 151, the drive mechanism 123 motor 152, and the drive mechanism 123 belt 153 to create a belt drive is well-known and documented in the mechanical arts.

The mounting apparatus 124 is a mechanical structure that mechanically links the first gyroscopic system 121, the second gyroscopic system 122, and the drive mechanism 123 to the motor structure housing 125. The mounting apparatus 124 transfers the net of the reactive forces generated by the first gyroscopic system 121 and the second gyroscopic system 122 to the motor structure housing 125. The mounting apparatus 124 comprises a mounting ring 161, a first mounting shaft 162, a second mounting shaft 163, a first mounting plate 164, and a second mounting plate 165.

The mounting ring 161 is a ring structure. The mounting ring 161 is a circular structure. The mounting ring 161 mechanically links to the drive mechanism 123 wheel 151. The mounting ring 161 mechanically links to the first spinning disk 131 of the first gyroscopic system 121. The mounting ring 161 mechanically links to the second spinning disk 141 of the second gyroscopic system 122.

The first mounting shaft 162 is a mechanical structure that attaches the exterior surface of the mounting ring 161 to the interior surface of the motor structure housing 125. The first mounting shaft 162 positions the mounting ring 161 at an elevation that allows the drive mechanism 123 wheel 151 of the drive mechanism 123 to rotate. The second mounting shaft 163 is a mechanical structure that attaches the exterior surface of the mounting ring 161 to the interior surface of the motor structure housing 125. The second mounting shaft 163 positions the mounting ring 161 at an elevation that allows the drive mechanism 123 wheel 151 of the drive mechanism 123 to rotate.

The first mounting plate 164 is a disk-shaped plate structure. The first mounting plate 164 forms a mechanical linkage with the drive mechanism 123 wheel 151 of the drive mechanism 123. The first mounting plate 164 forms a mechanical linkage with the first spinning disk 131 of the first gyroscopic system 121. The first mounting plate 164 forms a mechanical linkage with the second spinning disk 141 of the second gyroscopic system 122. The drive mechanism 123 wheel 151 mechanically links to the first mounting plate 164 by inserting into a first slot selected from a first plurality of slots formed in the first mounting plate 164. The first spinning disk 131 and the second spinning disk 141 mechanically links to the first mounting plate 164 by inserting into a second slot selected from the first plurality of slots formed in the first mounting plate 164. The second spinning disk 141 mechanically links to the first mounting plate 164 by inserting into a third slot selected from the first plurality of slots formed in the first mounting plate 164.

The second mounting plate 165 is a disk-shaped plate structure. The second mounting plate 165 forms a mechanical linkage with the drive mechanism 123 wheel 151 of the drive mechanism 123. The second mounting plate 165 forms a mechanical linkage with the first spinning disk 131 of the first gyroscopic system 121. The second mounting plate 165 forms a mechanical linkage with the second spinning disk 141 of the second gyroscopic system 122. The drive mechanism 123 wheel 151 mechanically links to the second mounting plate 165 by inserting into a first slot selected from a second plurality of slots formed in the second mounting plate 165. The first spinning disk 131 mechanically links to the second mounting plate 165 by inserting into a second slot selected from the second plurality of slots formed in the second mounting plate 165. The second spinning disk 141 mechanically links to the second mounting plate 165 by inserting into a third slot selected from the second plurality of slots formed in the second mounting plate 165.

The following definitions were used in this disclosure:

Band: As used in this disclosure, a band is a flat loop of material.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically cause the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Form Factor: As used in this disclosure, the term form factor refers to the size and shape of an object.

Gimbal: As used in this disclosure, a gimbal is a pivoting structure that supports an object in such a manner that the object can be rotated around a single axis of rotation. An object mounted in a first gimbal can be mounted in a second gimbal such that: 1) the first gimbal can be rotated within the second gimbal; and, 2) the object subsequently has a second axis of rotation. Such methods can be repeated in a recursive manner. Designs and methods to mount gimbals in gimbals are well-known and documented in the mechanical arts. Gimbals are often used to keep an object steady in a moving environment.

Gyroscope: As used in this disclosure, a gyroscope is a rotating disk. The angular momentum of a gyroscope is such that when a force is applied to a gyroscope that deflects the axis of rotation of the gyroscope, the gyroscope will generate an opposing force that attempts to return the center axis of the gyroscope to the line of its original axis of rotation. The gyroscope is often mounted in a gimbal such that the center of rotation will remain in a fixed position that is independent of the movement and rotation of the structure that the combined structure of the gyroscope and gimbal is mounted in.

Housing: As used in this disclosure, a housing is a rigid structure that encloses and protects one or more devices.

Impulse: As used in this disclosure, an impulse refers to the application of a force over a period of time. The use of the term impulse often implies a relatively short period of time.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Motor: As used in this disclosure, a motor refers to the method of transferring energy from an external power source into rotational mechanical energy.

Orientation: As used in this disclosure, orientation refers to the positioning of a first object relative to: 1) a second object; or, 2) a fixed position, location, or direction.

Pedestal: As used in this disclosure, a pedestal is an intermediary load bearing structure that that forms a load path between two objects or structures.

Ring: As used in this disclosure, a ring is a term that is used to describe a disk-like structure through which an aperture is formed. Rings are often considered loops.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Shaft: As used in this disclosure, a shaft is a long, narrow and rigid prism structure that is used as: 1) a structural element of a larger object; or 2) as a grip or lever for a handle. Shafts often have a cylindrical shape.

Slip Ring: As used in this disclosure, a slip ring is an electrical device that forms an electrical connection between a stationary object and a rotating object.

Slot: As used in this disclosure, a slot is a long narrow cut or opening that is formed in or through an object.

Torque: As used in this disclosure, a torque refers to a force that causes an object to rotate.

The following definitions and directional references were used in this disclosure:

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A gyroscopic impulse motor comprising
a plurality of GIP motor structures, a pedestal;
wherein the gyroscopic impulse motor is configured for use with a superstructure;
wherein the pedestal is configured to attach the plurality of GIP motor structures to the superstructure;
wherein the gyroscopic impulse motor is configured to transfer a plurality of independent torqueing forces to the superstructure;
wherein each of the plurality of GIP motor structures generates one of the independent torqueing forces that form the plurality of independent torqueing forces;
wherein by independent is meant the amount of force applied by any first independent torqueing force is independent of the amount of torqueing force applied by any second independent torqueing force generated by the gyroscopic impulse motor;
wherein by independent is further meant that the selected direction any first independent torqueing force is independent of the selected direction of any second independent torqueing force generated by the gyroscopic impulse motor;
wherein the superstructure is configured to be rotated by controlling the amount and direction of the plurality of independent torqueing forces applied by the gyroscopic impulse motor to the superstructure;
wherein by properly aligning the amount and direction of the plurality of independent torqueing forces applied by the gyroscopic impulse motor, a net propulsive force can further be generated;
wherein the plurality of GIP motor structures are mounted on the pedestal such that any first individual GIP motor structure selected from the plurality of GIP motor structures is perpendicular to both any second individual GIP motor structure and to any individual third GIP motor structure selected from the plurality of GIP motor structures;
wherein the pedestal is a mechanical structure that is configured to transfer the load of the torqueing forces generated by each of the motors directly to the superstructure.

2. The gyroscopic impulse motor according to claim 1
wherein each of the plurality of GIP motor structures is a gyroscopic structure;
wherein each of the plurality of GIP motor structures generates a torqueing force that returns the axis of rotation of the gyroscopic structure to an original position after the axis of rotation has been deflected by a force;
wherein each of the plurality of GIP motor structures is configured to transfer this torqueing force to the pedestal and the superstructure.

3. The gyroscopic impulse motor according to claim 2
wherein the plurality of GIP motor structures comprises a collection of individual GIP motor structures;
wherein the plurality of GIP motor structures comprises an x-axis GIP motor structure, a y-axis GIP motor structure, and a z-axis GIP motor structure;
wherein the x-axis GIP motor structure is a first individual GIP motor structure selected from the plurality of GIP motor structures;
wherein the x-axis GIP motor structure attaches to the pedestal such that the x-axis GIP motor structure is oriented along an arbitrarily selected x-axis;
wherein the y-axis GIP motor structure is a second individual GIP motor structure selected from the plurality of GIP motor structures;
wherein the y-axis GIP motor structure attaches to the pedestal such that the y-axis GIP motor structure is oriented along a selected y-axis that is perpendicular to the x-axis of the x-axis GIP motor structure;
wherein the z-axis GIP motor structure is a third individual GIP motor structure selected from the plurality of GIP motor structures;
wherein the z-axis GIP motor structure attaches to the pedestal such that the z-axis GIP motor structure is oriented along a selected z-axis that is both: a) perpendicular to the y-axis of the y-axis GIP motor structure; and, b) perpendicular to the x-axis of the x-axis GIP motor structure.

4. The gyroscopic impulse motor according to claim 2
wherein the plurality of GIP motor structures comprises a collection of individual GIP motor structures;
wherein each individual GIP motor structure is a GIP motor structure selected from the plurality of GIP motor structures;
wherein the individual GIP motor structure controls the amount of torqueing force transferred to the pedestal;
wherein the individual GIP motor structure controls the direction of the torqueing force transferred to the pedestal;
wherein each individual GIP motor structure selected from the plurality of GIP motor structures controls the amount of torqueing force generated by the individual GIP motor structure;
wherein each individual GIP motor structure selected from the plurality of GIP motor structures controls the direction of the torqueing force generated by the individual GIP motor structure;
wherein each of the plurality of GIP motor structures is independently controlled;
wherein by independently controlled is meant that the amount and direction generated by any first individual GIP motor structure selected from the plurality of GIP motor structures is selected independently of the amount and direction of the torqueing force generated by any second individual GIP motor structure selected from the plurality of GIP motor structures;

wherein by independently controlling the torqueing force generated by each of the plurality of GIP motor structures, the vector sum of each of the independently controlled torqueing forces can be configured to control the rotation of the superstructure.

5. The gyroscopic impulse motor according to claim 4
wherein each individual GIP motor structure comprises a first gyroscopic system, a second gyroscopic system, a drive mechanism, a mounting apparatus, and a motor structure housing;
wherein the motor structure housing is a rigid structure that contains the first gyroscopic system, the second gyroscopic system, the drive mechanism, and the mounting apparatus;
wherein the motor structure housing transfers the torqueing forces generated by the first gyroscopic system, the second gyroscopic system, the drive mechanism, and the mounting apparatus to the pedestal.

6. The gyroscopic impulse motor according to claim 5
wherein the drive mechanism is a mechanical structure;
wherein the drive mechanism is a rotating structure;
wherein the rotation of the drive mechanism is mechanically driven;
wherein the first gyroscopic system and the second gyroscopic system attach to the drive mechanism;
wherein the position of the second gyroscopic system on the drive mechanism is diametrically opposed to the position of the first gyroscopic system on the drive mechanism;
wherein the rotation of the drive mechanism rotates the first gyroscopic system such that the rotation of the drive mechanism applies a displacement force to the first gyroscopic system;
wherein the drive mechanism rotates the second gyroscopic system such that the rotation of the drive mechanism applies a displacement force to the second gyroscopic system.

7. The gyroscopic impulse motor according to claim 6
wherein the mounting apparatus is a mechanical structure that mechanically links the first gyroscopic system, the second gyroscopic system, and the drive mechanism to the motor structure housing.

8. The gyroscopic impulse motor according to claim 7
wherein the mounting apparatus transfers the net of the reactive forces generated by the first gyroscopic system and the second gyroscopic system to the motor structure housing.

9. The gyroscopic impulse motor according to claim 8
wherein the first gyroscopic system is a gyroscope-based structure;
wherein the first gyroscopic system attaches to the drive mechanism;
wherein the first gyroscopic system is mechanically linked to the mounting apparatus;
wherein the first gyroscopic system attaches to the drive mechanism such that the rotation of the drive mechanism rotates the first gyroscopic system;
wherein the structure of the first gyroscopic system transfers the reactive force generated by the first gyroscopic system to the mounting apparatus;
wherein the reactive force generated by the first gyroscopic system generates a portion of the torqueing force generated by the individual GIP motor structure through the mounting apparatus and the motor structure housing.

10. The gyroscopic impulse motor according to claim 9
wherein the second gyroscopic system is a gyroscope-based structure;
wherein the second gyroscopic system attaches to the drive mechanism;
wherein the second gyroscopic system is mechanically linked to the mounting apparatus;
wherein the drive mechanism is a rotating structure;
wherein the second gyroscopic system attaches to the drive mechanism such that the rotation of the drive mechanism rotates the second gyroscopic system;
wherein the structure of the second gyroscopic system transfers the reactive force generated by the second gyroscopic system to the mounting apparatus;
wherein the reactive force generated by the second gyroscopic system generates a portion of the torqueing force generated by the individual GIP motor structure through the mounting apparatus and the motor structure housing;
wherein the position of the second gyroscopic system on the drive mechanism is diametrically opposed to the position of the first gyroscopic system;
wherein the direction of rotation of the gyroscopic structure of the second gyroscopic system is opposite to the direction of rotation of the gyroscopic structure of the first gyroscopic system.

11. The gyroscopic impulse motor according to claim 10
wherein the first gyroscopic system comprises a first spinning disk, a first gyroscopic drive motor, and a first slip ring connection;
wherein the first spinning disk is a disk structure;
wherein the first spinning disk has a cylindrical disk shape;
wherein the rotating structure of the first spinning disk forms the gyroscopic element of the first gyroscopic system;
wherein the first spinning disk comprises a first SD shaft and a first belt disk;
wherein the first SD shaft is a mechanical structure that attaches the first spinning disk of the first gyroscopic system to the interior surface of the ring structure of the drive mechanism wheel of the drive mechanism;
wherein the first SD shaft attaches the first spinning disk to the drive mechanism wheel such that the first spinning disk can rotate freely;
wherein the first belt disk is a disk structure that attaches to the face of the disk structure of the first spinning disk that is distal from the second spinning disk of the second gyroscopic system;
wherein the center axis of the disk structure of the first belt disk aligns with the center axis of the disk structure of the first spinning disk;
wherein the first belt disk forms an attachment point for use by the first drive belt;
wherein the first drive belt is a belt that attaches the first gyroscopic drive motor to the first belt disk to create a belt drive used to rotate the first spinning disk to create the gyroscopic structure of the first gyroscopic system;
wherein the first gyroscopic drive motor is an electric motor;
wherein the first gyroscopic drive motor attaches to the inner surface of the ring structure of the drive mechanism wheel of the drive mechanism;

wherein the first gyroscopic drive motor attaches to the first spinning disk such that the rotation of the first gyroscopic drive motor rotates the first spinning disk;

wherein the first gyroscopic drive motor further comprises a first drive belt;

wherein the first slip ring connection electrically connects the first gyroscopic drive motor to an externally provisioned source of electricity;

wherein the first slip ring connection allows the first gyroscopic drive motor to draw electricity while the drive mechanism wheel of the drive mechanism is rotating.

12. The gyroscopic impulse motor according to claim 11 wherein the second gyroscopic system comprises a second spinning disk, a second gyroscopic drive motor, and a second slip ring connection;

wherein the second spinning disk is a disk structure;

wherein the second spinning disk has a cylindrical disk shape;

wherein the rotating structure of the second spinning disk forms the gyroscopic element of the second gyroscopic system;

wherein the second spinning disk comprises a second SD shaft and a second belt disk;

wherein the second gyroscopic drive motor is an electric motor;

wherein the second gyroscopic drive motor attaches to the inner surface of the ring structure of the drive mechanism wheel of the drive mechanism;

wherein the second gyroscopic drive motor attaches to the second spinning disk such that the rotation of the second gyroscopic drive motor rotates the second spinning disk;

wherein the second gyroscopic drive motor further comprises a second drive belt;

wherein the second SD shaft is a mechanical structure that attaches the second spinning disk of the second gyroscopic system to the interior surface of the ring structure of the drive mechanism wheel of the drive mechanism;

wherein the second SD shaft attaches the second spinning disk to the drive mechanism wheel such that the second spinning disk can rotate freely;

wherein the second belt disk is a disk structure that attaches to a point on the face of the disk structure of the second spinning disk that is distal from the first spinning disk of the first gyroscopic system;

wherein the center axis of the disk structure of the second belt disk aligns with the center axis of the disk structure of the second spinning disk;

wherein the second belt disk forms an attachment point for use by the second drive belt;

wherein the second drive belt is a belt that attaches the second gyroscopic drive motor to the second belt disk to create a belt drive used to rotate the second spinning disk to create the gyroscopic structure of the second gyroscopic system;

wherein the second slip ring connection electrically connects the second gyroscopic drive motor to an externally provisioned source of electricity;

wherein the second slip ring connection allows the second gyroscopic drive motor to draw electricity while the drive mechanism wheel of the drive mechanism is rotating.

13. The gyroscopic impulse motor according to claim 12 wherein the drive mechanism comprises a drive mechanism wheel, a drive mechanism motor, and a drive mechanism belt;

wherein the drive mechanism wheel is a ring structure;

wherein the drive mechanism wheel is a circular structure;

wherein the drive mechanism wheel is a rotating structure;

wherein the drive mechanism wheel mechanically connects to the mounting apparatus;

wherein the drive mechanism motor is an electric motor;

wherein the drive mechanism motor attaches to the motor structure housing of the individual GIP motor structure;

wherein the rotation of the drive mechanism motor forms a belt drive system that drives the rotation of the drive mechanism wheel;

wherein the drive mechanism belt is a band structure;

wherein the drive mechanism belt attaches the drive mechanism motor to the drive mechanism wheel such that the rotation of the drive mechanism motor rotates the drive mechanism wheel.

14. The gyroscopic impulse motor according to claim 13 wherein the first gyroscopic system attaches to the inner surface of the ring structure of the drive mechanism wheel;

wherein the first gyroscopic drive motor attaches to the inner surface of the ring structure of the drive mechanism wheel;

wherein the second gyroscopic system attaches to the inner surface of the ring structure of the drive mechanism wheel;

wherein the second gyroscopic drive motor attaches to the inner surface of the ring structure of the drive mechanism wheel.

15. The gyroscopic impulse motor according to claim 14 wherein the mounting apparatus comprises a mounting ring, a first mounting shaft, a second mounting shaft, a first mounting plate, and a second mounting plate;

wherein the mounting ring is a ring structure;

wherein the mounting ring is a circular structure;

wherein the mounting ring mechanically links to the drive mechanism wheel;

wherein the mounting ring mechanically links to the first spinning disk of the first gyroscopic system;

wherein the mounting ring mechanically links to the second spinning disk of the second gyroscopic system;

wherein the first mounting shaft is a mechanical structure that attaches the exterior surface of the mounting ring to the interior surface of the motor structure housing;

wherein the first mounting shaft positions the mounting ring at an elevation that allows the drive mechanism wheel of the drive mechanism to rotate;

wherein the second mounting shaft is a mechanical structure that attaches the exterior surface of the mounting ring to the interior surface of the motor structure housing;

wherein the second mounting shaft positions the mounting ring at an elevation that allows the drive mechanism wheel of the drive mechanism to rotate.

16. The gyroscopic impulse motor according to claim 15 wherein the first mounting plate is a disk-shaped plate structure;

wherein the first mounting plate forms a mechanical linkage with the drive mechanism wheel of the drive mechanism;

wherein the first mounting plate forms a mechanical linkage with the first spinning disk of the first gyroscopic system;

wherein the first mounting plate forms a mechanical linkage with the second spinning disk of the second gyroscopic system;

wherein the second mounting plate is a disk-shaped plate structure;

wherein the second mounting plate forms a mechanical linkage with the drive mechanism wheel of the drive mechanism;

wherein the second mounting plate forms a mechanical linkage with the first spinning disk of the first gyroscopic system;

wherein the second mounting plate forms a mechanical linkage with the second spinning disk of the second gyroscopic system;

wherein the drive mechanism wheel mechanically links to the first mounting plate by inserting into a first slot selected from a first plurality of slots formed in the first mounting plate;

wherein the first spinning disk and the second spinning disk mechanically links to the first mounting plate by inserting into a second slot selected from the first plurality of slots formed in the first mounting plate;

wherein the second spinning disk mechanically links to the first mounting plate by inserting into a third slot selected from the first plurality of slots formed in the first mounting plate;

wherein the second mounting plate is a disk-shaped plate structure;

wherein the second mounting plate forms a mechanical linkage with the drive mechanism wheel of the drive mechanism;

wherein the second mounting plate forms a mechanical linkage with the first spinning disk of the first gyroscopic system;

wherein the second mounting plate forms a mechanical linkage with the second spinning disk of the second gyroscopic system;

wherein the drive mechanism wheel mechanically links to the second mounting plate by inserting into a first slot selected from a second plurality of slots formed in the second mounting plate;

wherein the first spinning disk mechanically links to the second mounting plate by inserting into a second slot selected from the second plurality of slots formed in the second mounting plate;

wherein the second spinning disk mechanically links to the second mounting plate by inserting into a third slot selected from the second plurality of slots formed in the second mounting plate.

* * * * *